United States Patent [19]

Brakus

[11] Patent Number: 4,639,847

[45] Date of Patent: Jan. 27, 1987

[54] CIRCUIT ARRANGEMENT FOR CONTROLLED POWER SUPPLY DEVICES PARTICULARLY FOR AUTOCONVERTERS

[75] Inventor: Bogdan Brakus, Puchheim, Fed. Rep. of Germany

[73] Assignee: Siemens Aktiengesellschaft, Berlin and Munich, Fed. Rep. of Germany

[21] Appl. No.: 731,740

[22] Filed: May 8, 1985

[30] Foreign Application Priority Data

Jun. 5, 1984 [DE] Fed. Rep. of Germany ....... 3420908

[51] Int. Cl.$^4$ .............................................. H02M 1/14
[52] U.S. Cl. ........................................ 363/46; 363/48
[58] Field of Search ...................... 363/44, 45, 46, 47, 363/48, 37; 333/172, 181

[56] References Cited

U.S. PATENT DOCUMENTS 3,746,963 7/1973 VeNard, II ........................... 363/47

FOREIGN PATENT DOCUMENTS 1563054 4/1966 Fed. Rep. of Germany .
2433825 1/1976 Fed. Rep. of Germany .

Primary Examiner—Peter S. Wong
Assistant Examiner—Emanuel Todd Voeltz
Attorney, Agent, or Firm—Hill, Van Santen, Steadman & Simpson

[57] ABSTRACT

A circuit for controlled power supply devices, particularly for autoconverters, for suppressing the oscillatory tendency in such device has an input filter forming a parallel oscillator circuit, which can be excited to oscillations on the basis of a partially negative input impedance of the autoconverter. A series oscillator circuit is connected to the parallel oscillating circuit and is tuned to the resonant frequency thereof, such that an impedance minimum occurs at the resonant frequency, whereas the parallel resonant maximums of the impedance, which appear at a lower and at a higher frequency, can be damped by a comparatively small ohmic resistance, such that unwanted oscillations are prevented. The circuit represents a low capacitive load to the feed network, and exhibits low dissipated power through the ohmic resistor, making the circuit particularly adapted for high output power packs which are operated by a three-phase network.

4 Claims, 5 Drawing Figures

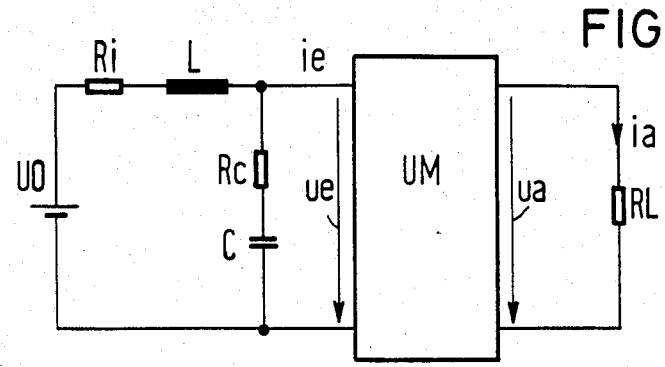
FIG 1
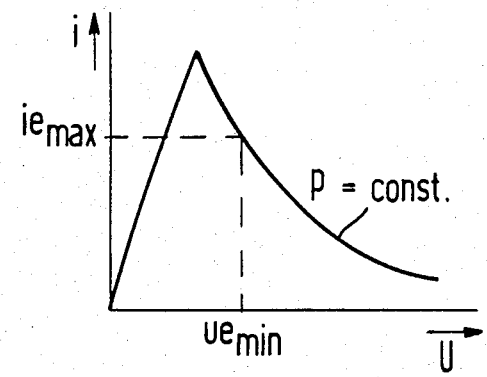
FIG 2
FIG 3
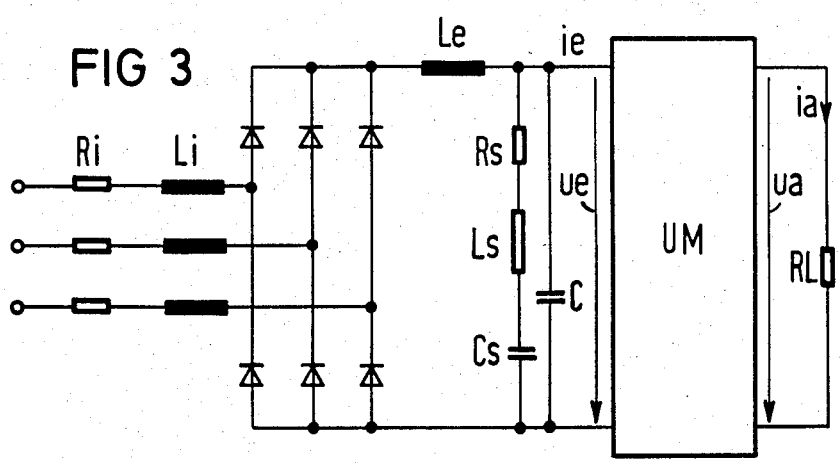

CIRCUIT ARRANGEMENT FOR CONTROLLED POWER SUPPLY DEVICES PARTICULARLY FOR AUTOCONVERTERS

BACKGROUND OF THE INVENTION

1. Field of the Invention

The present invention relates to a circuit for preventing unwanted oscillations in controlled power supply devices, and particularly to such a circuit for autoconverters.

2. Description of the Prior Art

Conventional controlled power supply devices tend toward oscillations. The reason for such oscillations is that the circuit portion effecting the control characteristically has, at least in certain operating regions, a negative slope. The negative slope represents the relationship between the input voltage and the input current. For example, if the output voltage with a given load resistor of a loss-free or low-loss autoconverter is to be controlled to a rated value, the load resistor absorbs a constant power, which is independent of the input voltage. The product of the input voltage and the input current of the controlled circuit portion is proportional to this power, that is, the product is also a constant. This has the consequence that the input current becomes lower with increasing voltage (and becomes higher with decreasing voltage), so that the differential input resistance of the controlled circuit portion is negative in certain operating regions. In that range of the input voltage in which the power absorbed by this circuit portion is essentially constant, the current-voltage relationship exhibits a hyperbolic path, so that the (negative) differential input resistance corresponding to the slope of this relationship is lowest when the input voltage is at a lowest value at which error-free control of the power supply device is still possible.

Conventional controlled power supply devices of this type have an input filter circuit for suppressing disruptive reactions on the feed network. This input circuit is generally comprised of at least one series inductance and at least one shunt capacitance. These two circuit elements, whose values are defined by the demands of an adequate filtering effect, represent an oscillatory structure which can be excited to independent oscillations in combination with the negative input resistance of the controlled circuit portion. Investigations of the stability conditions for this circuit show that oscillations can occur when the quotient of the value of the inductance and the product of the capacitance and the sum of the ohmic resistors involved (the internal resistance of the source and the equivalent series resistance of the capacitance) is greater than the amount of the (negative) input resistance of the controlled circuit portion. This condition applies approximately when the product of the ohmic resistances is low in comparison to the quotient of inductance and capacitance. Inversely, this means that stable operation is guaranteed when the sum of the ohmic resistances is greater than the quotient of the inductance and the product of the capacitance and the amount of the negative input impedance. For purpose of analysis, the negative input impedance is taken to be the minimum value possible in practical operation, which corresponds to the quotient of the lowest possible input voltage and the highest possible input current. Identifying this relationship would lead one to believe that the problem of undesirable oscillations can be eliminated by increasing the capacitance of the filter circuit and/or the ohmic resistance effective in series therewith. On the basis of such steps, the parallel circuit formed by the elements of the filter circuit is detuned and/or attenuated such that the stability condition is met. The increase of the effective capacitance may be achieved by the use of a high-capacitance electrolytic capacitor switched parallel to an existing high-quality pulse storage capacitor of the filtering circuit.

For modern power supply devices including extremely high output autoconverters, however, the above two approaches for eliminating the oscillatory tendency of the power supply are unsuitable. One of the most important advantages of such high-output autoconverters operated at a three-phase network is that the capacitance of their input circuit (the filter circuit) can be very low thus resulting in a correspondingly low network load. This advantage would be eliminated by increasing the capacitance for the purpose of solving the problem of oscillatory tendency.

Similarly, increasing the resistance which is effective in series with the capacitance is in theory possible for high-output autoconverters, but as a practical matter, results in an unacceptably high leakage loss through the resistor. This is particularly true for operation at a three-phase network wherein high superimposed a.c. components remain after rectification. This high dissipated power presents two problems, the first of dissipating the generated heat which arises in relatively small volumes, and the second being that the high power deteriorates the efficiency to an unacceptable degree, thus frustrating another important advantage of modern autoconverter circuit technology.

SUMMARY OF THE INVENTION

It is an object of the present invention to provide a circuit for controlled power supply devices which decreases the oscillatory tendency of the power supply but does not represent a high capacitive load to the feed network and does not result in a high power dissipation, and thus does not present a noticeable effect on the efficiency of the circuit.

The above object is inventively achieved in a controlled power supply device having a controlled circuit portion which is preceded by an input section in the form of a filter circuit having at least one series inductance and one shunt capacitance, and the input portion additionally having a series oscillator or resonant circuit comprised of a further capacitance, a further inductance, and an ohmic damping resistor, the series oscillator being disposed in a shunt branch of the input circuit. The resonant frequency of the series circuit at least approximately corresponds to that of the parallel resonant circuit formed by the shunt capacitance and the series inductance of the filter circuit. The capacitance of the series resonant circuit is greater than the shunt capacitance of the parallel resonant circuit, and the inductance of the series resonant circuit is lower than series inductance in the parallel resonant circuit, such that the impedance of the resulting network has a minimum at a resonant frequency, and has maximums at a frequency lower than the resonant frequency. This lower frequency is defined by the series inductance of the filter circuit and the capacitance of the series resonant circuit. The combination also has an upper resonant frequency which is defined by the shunt capacitance of the filter circuit and the inductance of the series oscillator circuit. The damping resistor of the series resonant circuit is dimensioned such that at both the upper and the lower resonant frequencies, the "undamping" is overcompensated by the negative input impedance of the controlled circuit portion, corresponding to the quotient of a minimum input voltage and a maximum input current. The resonance of the filter circuit is thus compensated by a series resonance of the same frequency, so that the overall impedance is a minimum at this frequency, and therefore the risk of oscillation at this frequency is eliminated. As a result of the addition of the series resonant circuit, an oscillatory structure results having a frequency characteristic exhibiting two maxima which correspond to the parasitic resonances above and below the original resonant frequency. Examination of the stability condition for this oscillatory structure shows that the two parasitic resonances can be damped, such that by the use of relatively low-impedance resistors the risk of oscillations at those frequencies is also eliminated. The size of the resistance required for such damping is reduced in comparison to the value of resistance required for damping when the series oscillating circuit is not present. The resistance value when the series resonant circuit is utilized is reduced by approximately the same amount by which the inductance of the series resonant circuit is smaller than the series inductance of the filter circuit. The dissipated power is thus reduced by the same factor.

In a power supply built as described above having an output of 8 kW, this factor amounted to approximately 10. A theoretically possible further reduction of the damping resistance (and thus, of the dissipated power) is limited in practice by the fact that a compromise must be made with respect to the dimensions (and dissipation factors) of the circuit elements for the series resonant circuit. The factor of 10 has proven to be a favorable compromise for a power supply device of this type having an output as identified above.

DESCRIPTION OF THE DRAWINGS

FIG. 1 is a schematic circuit diagram of a conventional autoconverter for explaining the problems solved by the inventive circuit disclosed herein.

FIG. 2 is a graphical representation of the current-voltage characteristic of the input of the autoconverter shown in FIG. 1.

FIG. 3 is a schematic circuit diagram of a three-phase switched power supply constructed in accordance with the principles of the present invention.

DESCRIPTION OF THE PREFERRED EMBODIMENTS

Figure 4:
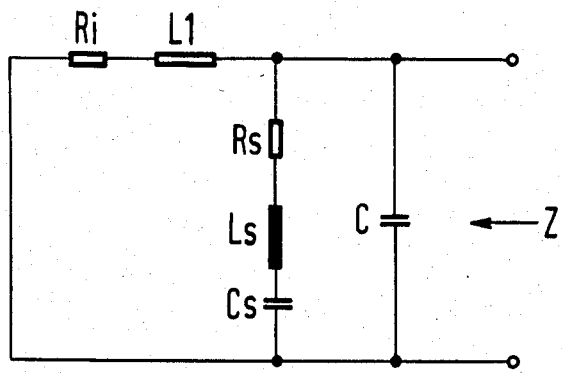
FIG. 4 is a schematic circuit diagram of a portion of the circuit constructed in accordance with the principles of the present invention showing the frequency-dependent impedance as seen from the input of the autoconverter.

A conventional power supply is shown in FIG. 1 having an autoconverter UM, such as a flow autoconverter, whose load switch is switched on and off at a constant frequency and is pulse duration modulated to a prescribed rated value for controlling the output voltage ua. When the output voltage ua is held to a constant value by this control, the output power, which is equal to ua×ia, at the load resistor RL is also constant, with a given size of the load resistor RL. If the autoconverter UM has a sufficiently high efficiency, the input power, which is equal to ue×ie, essentially corresponds to the output power, and is also constant. The result is that the current-voltage characteristic, which reflects the relationship of ie and ue, exhibits the curve shown in FIG. 2. In the range of low output voltages ue, in which no control of the output voltage occurs, the current-voltage characteristic proceeds linearly. In the range adjacent thereto, in which the output voltage is regulated by influencing the pulse-duty factor of the load switch provided in the autoconverter UM, the characteristic curve is a hyperbola as shown in FIG. 2 which corresponds to the relationship ie=Pe/ue (where Pe is the input power as defined above). The input current ie becomes smaller in this range with increasing input voltage ue, and vice versa. This means that the differential input impedance of the autoconverter UM is negative in this region. This negative impedance may undamp the parallel oscillating circuit formed by the capacitance C, the inductance L and the ohmic resistors Rc or Ri which are effective in series with these elements. The ohmic resistance also includes the internal resistance of the source UO as well as the ohmic resistance of the inductor L. Such undamping may occur to such a degree that unwanted oscillations result.

Investigation of the stability conditions for the circuit shown in FIG. 1 permits differential equations for the system comprised of the illustrated circuit components (including the input impedance Re of the autoconverter UM) to be formulated. The system does not tend toward spontaneous oscillations, i.e., is stable, only when all solutions of the characteristic equation have negative real parts. This is approximately the case when $$|Re| > \frac{L}{C(Ri + Rc)} \qquad (1)$$

applies. The absolute value of Re is lowest when the maximum power $P_{max}$ of the autoconverter UM is produced, given a miminum input voltage $ue_{min}$, that is, with maximum input current $ie_{max}$. Because, due the aforementioned hyperbolic curve of the current-voltage relationship, the equation $|Re|=ue/ie$ applies, and the stability condition is approximately given by the following relationship:

$$\frac{ue_{min}}{ie_{max}} > \frac{L}{C(Ri + Rc)}. \qquad (2)$$

In order to meet this stability condition, conventional power supply design dictates making the capacitance C and/or the resistor Rc effective in the shunt arm sufficiently large. In addition to the existing capacitor having the capacitance C (which must be a high-grade pulse storage capacitor) an electrolytic capacitor having a correspondingly high capacitance may be disposed in a further shunt arm, the quality of this capacitator generally being so low that the corresponding equivalent series impedance helps to meet the above condition.

Both methods (resistance increase and/or capacitance increase) are unsuitable for modern high-power switched power packs, because these methods result in too high a capacitive load for the feed network, or too great an ohmic power dissipation.

In order to avoid these disadvantages of the conventional solution to the above problem, the power supply disclosed and claimed herein has an acceptor, or series oscillator, circuit in a shunt arm of the input circuit. An exemplary embodiment of this power supply is shown in FIG. 3. The embodiment shown in FIG. 3 is a three-phase power pack which is fed by the rectified voltage of a three-phase network. The impedance of the feed network is indicated by ohmic internal resistors Ri and inductances Li. The inductance disposed in the series arm of the input circuit is referenced Le. The series resonant circuit is formed by a capacitor Cs, and inductance Ls, and an ohmic damping resistor Rs. The other circuit components have the same designations as in FIG. 1. The inputs may be connected to the input circuitry through diodes, as shown in FIG. 3.

An equivalent circuit diagram is shown in FIG. 4 for the complex impedance Z seen by the autoconverter UM in the direction toward the feed network shown in FIG. 3. In this embodiment, the network inductance Li and the series inductance Le of the input circuit are combined into an overall or total inductance referenced Ll. The series resonant circuit composed of the elements Cs, Ls and Rs is tuned to the same frequency as the parallel resonant circuit comprised of the elements C, Ll and Ri. The relationship Ll·C=Ls·Cs applies, whereby the influence of the ohmic resistors Ri and Re on the resonant frequency is neglected.

Figure 5:
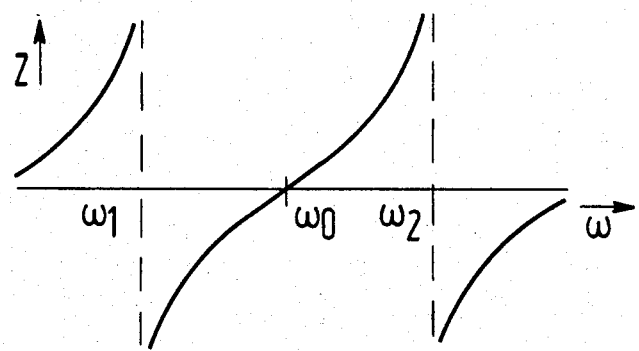
FIG. 5 is a graphical representation of the impedance of the network shown in FIG. 4 as a function of the frequency, with the effect of ohmic resistors being omitted.

The curve of the impedance Z as a function of frequency is shown in FIG. 5, wherein the influence of the ohmic resistors is again neglected, so that the impedance Z is represented as pure reactive impedance. As shown in FIG. 5, the impedance becomes zero at the "main resonance" given by the expression $\sqrt{Ll \cdot C} = \sqrt{Ls \cdot Cs}$. Two further resonant locations exist respectively above and below this main resonance $\omega_0$, these being referenced $\omega_1$ and $\omega_2$. The curve shown in FIG. 5 has the following equation:

$$Z = \frac{j\omega Ll(1 - \omega^2 Ls \cdot Cs)}{(1 - \omega^2 Ls \cdot Cs)^2 - \omega^2 Ll \cdot Cs} \tag{3}$$

Because the influence of the ohmic resistors is not taken into consideration in the graph shown in FIG. 5, impedance maximums of finite size are present at the two resonant frequencies.

The resonant frequency $\omega_1$ is essentially defined by the inducance Ll and the capacitance Cs. The above-specified stability condition for this resonant location supplies a conditional inequality for the damping resistance, namely:

$$Ri + Rs > \frac{Ll \cdot ie_{max}}{Cs \cdot ue_{min}} \tag{4}$$

For the resonant location $\omega_2$, which is essentially defined by the inductance Ls and the capacitance C, the stability condition is as follows:

$$Rs > \frac{Ls \cdot ie_{max}}{C \cdot ue_{min}}. \tag{5}$$

The damping resistor Rs can be made smaller to the same degree that the capacitance Cs is made larger or the inductance Ls is made lower.

In an embodiment of a power pack which has been actually constructed having an output of 8 kW, the following values were used:

$ue_{min} = 550$ V $ie_{max} = 15$ A.

The circuit elements for the filter circuit of the input portion have the following values:

Ll = 2 mH and

C = 10 μF.

The following values were selected for the series resonant circuit:

Ls = 90 H and

Cs = 220 μF.

When these values are entered in the above-specified inequalities for the stability conditions, the resulting values are obtained:

$$Ri + Rs > \frac{2 \cdot 10^{-3} \cdot 15}{220 \cdot 1^{-6} \cdot 550} = 0.25 \text{ Ohm} \tag{6}$$

and $$Rs > \frac{90 \cdot 10^{-6} \cdot 15}{10 \cdot 10^{-6} \cdot 550} = 0.25 \text{ Ohm}. \tag{7}$$

A value of 0.39 Ohm was selected for Rs for practical use. Very good stability and comparatively low power dissipation is achieved therewith. If the series resonant circuit were not present, in order to achieve the same amount of compensation, the damping resistor would have to have a value approximately 10 times as high, so that the power dissipation would also have been greater by a factor of 10.

Guidelines for practical dimensioning of the circuit shown in FIG. 3 are as follows. The capacitance Cs should be about 5 to 20 times the value of Ce. Because of the condition Ls×Cs=Ll×C (the same main resonance of the parallel and series resonant circuits, Ls should be 5 to 20 times smaller than the inductance Ll. The damping resistance Rs of the series resonant circuit is sure to meet the above-specified stability conditions when it has the value 2·(Ll·ie$_{max}$)/(Cs·ue$_{min}$).

The invention disclosed and claimed herein is not limited to power pack devices for alternating current, such as three-phase networks. The circuit can be employed with full advantage in all other power supply devices wherein a controlled circuit part has a negative input impedance in the working range occurring during operation, and thus the risk of undesired oscillations is present in conjunction with an input filtering circuit.

Although modifications and changes may be suggested by those skilled in the art, it is the intention of the inventor to embody within the patent warranted hereon all changes and modifications as reasonably and properly come within the scope of his contribution to the art.

I claim as my invention:

1. A circuit for a controlled power supply device connectable to a feed network, said device having a controlled circuit portion exhibiting a negative input impedance in at least a portion of its operating range, and an input circuit portion, said input circuit portion being a filter having at least a series inductance and a shunt capacitance for suppressing disruptions to the feed network, said circuit comprising:

- a series resonant circuit having a further inductance, a further capacitance and an ohmic resistance connected in a shunt branch of said filter, said series resonant circuit having a resonant frequency substantially equal to the resonant frequency of said filter formed by said series inductance and said shunt capacitance;
- the capacitance of the filter being larger than the capacitance of the series resonant circuit and the inductance of the filter being smaller than the inductance of the series resonant circuit such that the impedance of the combination of said filter and said series resonant circuit has minimum at said resonant frequency, and further has respective maxima at a lower resonant frequency defined by the inductance of the filter and the capacitance of the series resonant circuit, and at a higher resonant frequency defined by the capacitance of the filter and the inductance of the series resonant circuit; and
- the ohmic damping resistance of the series resonant circuit has value such that at both said upper and lower resonant frequencies undamping of said controlled circuit portion is overcompensated by said negative input impedance.

2. A circuit as claimed in claim 1 wherein said negative input imedance corresponds to the quotient of a maximum input current and a minimum input voltage for said controlled circuit portion, and wherein said ohmic damping resistance of said series resonant circuit is larger than the quotient of the inductance of the series resonant circuit and the capacitance of the filter multiplied by the quotient of the maximum input current and the minimum input voltage of the controlled circuit portion.

3. A circuit as claimed in claim 1 wherein said network has a network inductance, and wherein the inductance of said resonant circuit is less by a factor of at least 5 than the combination of the inductance of said network and said filter, and wherein the capacitance of said series resonant circuit is greater by a factor of at least 5 than the capacitance of said filter.

4. A controlled power supply for use with a feed network having an internal resistance Ri and an internal inductance Li, said power supply comprising:

- an autoconverter having negative input impedance in at least a part of its operating range defined by the quotient of a maximum input current $ie_{max}$ and a minimum input voltage $ue_{min}$;
- a filter circuit interconnected between said autoconverter and said feed network having a series inductance Le and a shunt capacitance C; and
- a series resonant circuit having a resistance Rs, an inductance Ls and a capacitance Cs connected in a shunt branch of said filter for suppressing unwanted oscillations of said power supply, with $\sqrt{Ll \times C} = \sqrt{Ls \times Cs}$, wherein Ll=Li+Le and wherein $$Ri + Rs > \frac{Ll \cdot ie_{max}}{Cs \cdot ue_{min}} \text{ and } RS > \frac{Ls \cdot ie_{max}}{C \cdot ue_{min}}.$$

* * * * *